United States Patent
Gispert Casino et al.

(10) Patent No.: US 6,732,771 B2
(45) Date of Patent: May 11, 2004

(54) DISPENSING EDIBLE FROZEN PRODUCTS FROM CARTRIDGES

(75) Inventors: Juan Carlos Gispert Casino, Barcelona (ES); Jaume Hueso Malet, Barcelona (ES); Juame Oliveras Pico, Barcelona (ES)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 10/257,336
(22) PCT Filed: Mar. 30, 2001
(86) PCT No.: PCT/EP01/03652
§ 371 (c)(1), (2), (4) Date: Mar. 19, 2003
(87) PCT Pub. No.: WO01/78520
PCT Pub. Date: Oct. 25, 2001

(65) Prior Publication Data
US 2003/0160073 A1 Aug. 28, 2003

(30) Foreign Application Priority Data
Apr. 12, 2000 (ES) .......................................... 200000952

(51) Int. Cl.⁷ ................................................. B67C 3/26
(52) U.S. Cl. ....................... 141/270; 141/275; 141/250; 141/254; 141/263; 222/386; 222/326
(58) Field of Search ................................. 141/270, 275, 141/165, 250, 253, 254, 263, 267; 222/386, 387, 325, 326, 327, 390, 391; 426/516, 517, 519

(56) References Cited

U.S. PATENT DOCUMENTS

| | | | | | |
|---|---|---|---|---|---|
| 2,103,817 A | * | 12/1937 | Bror | ............................ | 141/270 |
| 2,626,133 A | * | 1/1953 | Reed | ............................ | 366/206 |
| 2,889,949 A | * | 6/1959 | Nirenberg | ................ | 414/416.1 |
| 3,061,279 A | * | 10/1962 | Reed | ............................ | 222/413 |
| 3,267,971 A | * | 8/1966 | Mueller | ........................ | 141/270 |
| 3,865,281 A | * | 2/1975 | Bryd et al. | ................... | 141/174 |
| 4,637,221 A | * | 1/1987 | Levine | .......................... | 62/342 |
| 4,861,255 A | * | 8/1989 | Ney | ............................ | 425/202 |
| 4,942,910 A | * | 7/1990 | Hamamura | ................... | 141/250 |
| 4,974,965 A | * | 12/1990 | Heinhold et al. | ........... | 366/289 |
| 5,069,364 A | * | 12/1991 | McGill | ......................... | 222/326 |
| 5,208,050 A | * | 5/1993 | Ney | ............................ | 222/386 |
| 5,232,027 A | * | 8/1993 | Tanaka et al. | .............. | 141/270 |
| 5,893,485 A | * | 4/1999 | McGill | ......................... | 141/270 |
| 5,918,767 A | * | 7/1999 | McGill | ......................... | 222/386 |
| 6,318,889 B1 | * | 11/2001 | Hansen, Sr. | ................. | 366/286 |

FOREIGN PATENT DOCUMENTS

| | | |
|---|---|---|
| DE | 297 12 273 | 11/1998 |
| WO | 01/19205 A1 | 3/2001 |
| WO | 01/78520 | 10/2001 |

* cited by examiner

Primary Examiner—Gregroy L. Huson
Assistant Examiner—Khoa D. Huynh
(74) Attorney, Agent, or Firm—Gerard J. McGowan, Jr.

(57) ABSTRACT

Edible frozen product extruding machine of the type using cartridges (3) which contain the frozen product (4) provided with an extrusion nozzle (5) and which rest on a platform (2), inside which cartridge acts a piston (6) which can move vertically by means of its stem (7) from the machine's driving devices, which centres its characteristics on incorporating to said stem (7) a side stop (8) which, in the downwards motion of piston (6) acts on a rod (9) which is parallel to stem (7) against the tension of a spring (11), which rod (9) is joined to a support (15) for cone (15) or vessel which receives the ice cream dose, so that with each operational cycle of the machine, initially cone (15) approaches nozzle (5) until the product is level with its opening, at which time stop (8) carries support (13) down, gradually distancing the cone from the nozzle as the classic overfilling of the cone is achieved, so that the frozen product considerably extends beyond its opening.

15 Claims, 3 Drawing Sheets

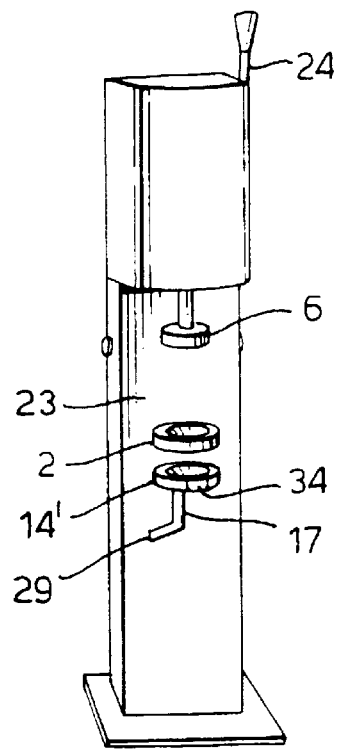
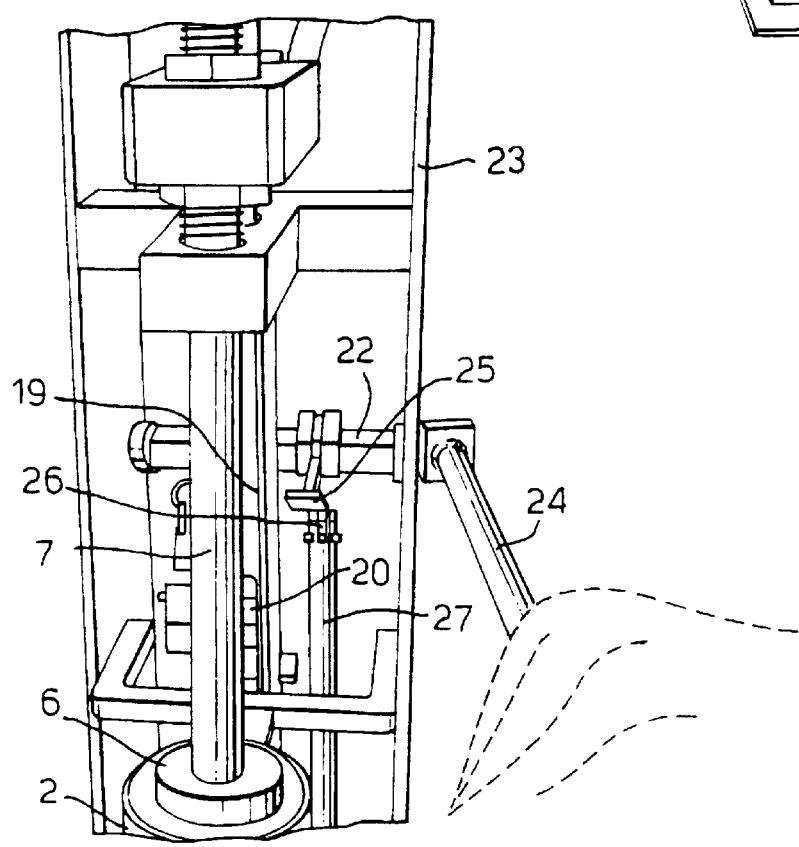

DISPENSING EDIBLE FROZEN PRODUCTS FROM CARTRIDGES

OBJECT OF THE INVENTION

The present invention relates to an extruding machine, of those used in supply for immediate consumption of an edible frozen product, which is received in a cone or any other suitable container, machine which centres its characteristics on incorporating a mechanism which allows the gradual descent of the cone as it is filled, as well as finally a lateral swivelling of the cone in order to simplify its extraction from the corresponding support.

BACKGROUND OF THE INVENTION

Extrusion machines for edible frozen products are known, such as that described in Spanish Patent application No. 9902028 (Frigo S. A.) in which machine a frame is provided with a support with a platform on which the cartridge which supplies the product is placed, so that by means of a plunger which is driven vertically by a rack, a piston which acts inside said cartridge is pushed and lowered, causing the product to be expelled outwards through a nozzle in the cartridge so that the product falls on a lower container designed for consumption, with the machine placed on a stand which supports it.

Naturally, between the nozzle which dispenses the product and the machine stand, enough space is left so that the container of the product may be comfortably handled, both while implanting and filling it and during its later extraction. However, a two-sided problem appears in the static structure described. On one hand the initial distance between the nozzle and the bottom of the container is too great, which means that the container must be raised manually while it is being filled. Secondly, when the ice-cream product is intended to considerably overflow the container's opening, such as when using cone-type containers which are also edible, when the container is removed sideways from the machine the ice-cream product may touch the lower end of the nozzle and so its shape may be affected, or it may even be partially removed from the container.

U.S. Pat. No. 5,232,027 is known which relates to an apparatus for serving soft ice cream or the like, this apparatus comprising a motor driving two grooved cams in which grooves slide corresponding roller pins, connected to as many arms, one of which is adapted to push on the recipient containing the soft ice cream to be dispensed and the other of which is adapted to displace with an upwards or downwards motion the support of the cone receiving the soft ice cream. Said support is also given a rotating mechanical motion which provides a capricious external appearance to the ice cream dispensed.

This apparatus does not provide a simple extraction of the ice cream cone once it is filled with the soft ice cream, and its extraction may cause crushing of its top part as it collides with the support of the ice cream dose container upon dispensing.

Likewise, as this apparatus has the axis of the deposit of ice cream to be dispensed and the axis of the cone receiving said soft ice cream out of alignment, in order to produce a capricious spiral form, this creates a difficulty in filling the lower part of the cone as the ice cream contacts the side walls of the cone before reaching its bottom.

Furthermore, this apparatus must perform a full cycle in its operation, both for dispensing and for removal of the container or cone receiving the ice cream, which is not always advisable nor well-suited to the user's needs.

DESCRIPTION OF THE INVENTION

The machine disclosed by the invention, based on a structure similar to that of the machine described in the previous paragraph, solves in a fully satisfactory manner the foregoing problems by incorporating a mechanism which in addition to supporting the container satisfactorily, even for wafer cones or similar containers, provides said container with a combined vertical upwards/downwards motion and sideways-swivelling, which is carried out basically automatically as the machine piston is actuated.

The mechanism is embodied in a side stop, suitably connected to the piston stem and therefore accompanying the latter in its displacement as the control lever is operated, the side stop acting on a rod parallel to said stem, which moves within a lateral guide and which can move downwards against the resistance of a spring, connected to the rod is a support for the cone, so that in the initial situation, when the control lever is free, the ice cream receiving cone is at its maximum upper position, which is maintained during a specific forwards motion of the piston due to an also specific distance between the lateral stop associated to the stem and the upper end of the lateral rod, specifically until the cone is filled, after which the rod, support and cone are carried downwards, so that the latter descends gradually and in parallel as the ice cream accumulates over and above the open end of the cone, until the ice cream dose is completed.

In accordance with a further characteristic of the invention, the aforementioned rod incorporates at any suitable position a lateral indicator which moves within a bent guide with a markedly rounded end, so that the guide forces the rod in the end of its axial path to rotate about its own axis, which results in a sideways swivelling of the cone support or ice cream receiving container, so that when the dose is completed the cone swivels sideways with respect to the vertical line of the product dispensing nozzle, so that it is no longer placed opposite it and can be easily removed from said support.

In parallel to the aforementioned bent guide the lower end position of the mechanism is stabilised, so that the dosing manipulation can be performed with a single hand, so that in order to repeat the operation it suffices to slightly and manually push the cone or container support sideways once the new empty cone is placed in it, so that the restoring spring which aids the rod causes said support to rise to the upper end position next to the product dispensing nozzle.

In accordance with an alternative embodiment of the machine, the aforementioned control level is provided with an arm or cam mounted on a swivelling shaft which may move within a slot of a main vertical arm, conveniently guided, which it carries during its downwards motion, to which arm is solidarity connected a support which is also joined to the piston stem, which is left so that it is not frontally opposite said arm and which thus moves downwards, with its motion synchronised with the operation of the control lever. In parallel and to the side of said arm is a further arm which in turn is driven by a second cam associated to the swivelling shaft of the control lever, which cam acts on the second arm after a prior swivelling motion of the control lever, to an extent as required to fill the cone or vessel which contains the ice cream in question.

On the main shaft is also mounted, so that it may move vertically, a perforated support for implanting the cone or the like which is connected to the second arm, so the actuation on said second arm of the corresponding cam causes a downwards motion of the support and thus of the cone. This motion takes place against the action of a spring mounted coaxially on the main arm, so that when the control lever is no longer being operated the spring will cause the cone support to rise.

More specifically, two sectors are defined in the aforementioned support with an orifice for implanting the cone, one is that mounted on the vertical arm itself and the other is the one which bears the orifice or housing for the cone, the two connected by means of a transverse stem which moves within a slot in the machine frame. The slot has an initial downwards segment, as required for the cone to be suitably separated from the extrusion nozzle as the ice cream ball forms on said cone, and a lateral inclined segment which causes the lateral swivelling of the cone support with a notch on its end in which the stem is finally locked and the cone support retained unless it is not manually acted upon, once the filled cone is replaced by an empty one.

Finally it must be pointed out that the main shaft includes a lateral roller on which a further cam rests, aided by a second spring, which tends to restore the position of said main arm and therefore of the piston when the manual operation of the control lever ceases.

DESCRIPTION OF THE DRAWINGS

As an aid for comprehension of the characteristics of the invention, a set of drawings is attached as an integral part of the description in which, for purposes of illustration and in a non-limiting nature, the following is shown:

FIG. 3 shows a front perspective view of an edible frozen product extruding machine according to the object of the present invention.

FIG. 4 also shows a front perspective view of an enlarged inset of the machine shown in the previous figure stripped of its protection frame and in accordance with an alternative embodiment of the invention.

PREFERRED EMBODIMENT OF THE INVENTION

Figure 1:
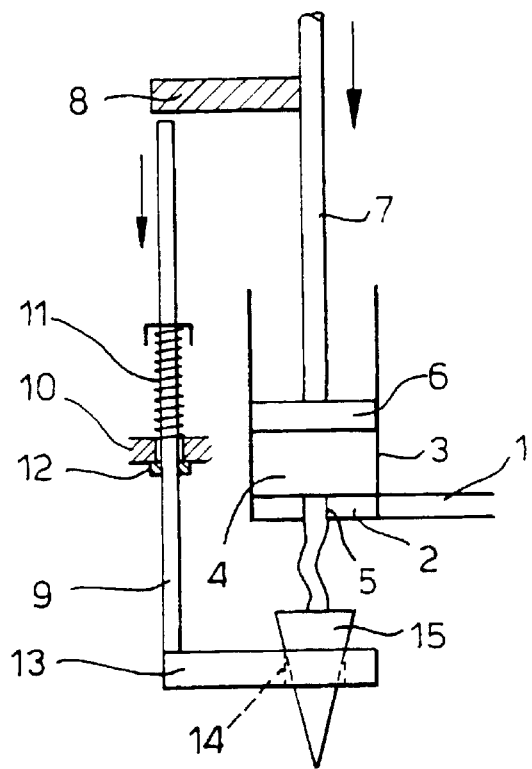
FIG. 1 shows a schematic representation in a side elevation view of part of an edible frozen product extruding machine, specifically of the part on which the characteristics of the invention are centred.
Figure 2:
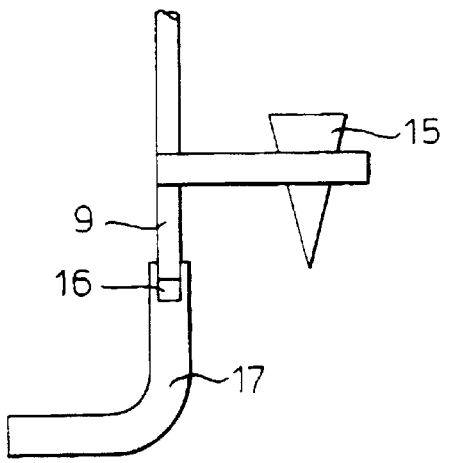
FIG. 2 shows, also in a schematic side elevation, an enlargement of the mechanism which provides the final and sideways swivelling of the support of the cone or ice cream receiving container.

In view of the referred figures, and particularly FIGS. 1 and 2, it can be seen how the extruding machine disclosed is of the type which comprise a support (1) for a platform (2) on which can be coupled cartridge (3) which contains the frozen product (4) cartridge which ends on the bottom in an extrusion nozzle (5), and within which moves a piston (6) which is actuated through the corresponding stem (7). The stem (7) may be driven downwards by any suitable means but this is preferably performed using an external lever which is aided by a toothed wheel and a rack. The motion of the stem (7) to extrude the frozen product (4) is against the action of a restoring spring, not shown in the drawings. The extruding machine may be mounted on a frame as is known in the art.

Thus, from this conventional basic structure the invention centres on providing, joined to stem (7) a lateral stop (8) which acts on the upper end of a rod (9). The rod (9) is retained by a vertical guide (10) and by a restoring spring (11) which tends to maintain it in a maximum upper position. This position which is also defined by stop (12) positioned beneath the vertical guide (10). The base of the rod (9) is received on a lateral support (13) which is also provided with an orifice (14) for implanting cone (15) and which is disposed axially opposite nozzle (5).

In accordance with this structure and by means of spring (11), at an extreme position of the machine before the control lever is actuated, ice cream cone or container (15) is placed near nozzle (5) such that it may receive frozen product (4) from cartridge (3) when piston (6) is lowered, driven by the control lever.

In this extreme position stop (8) is considerably distant from the upper end of rod (9) so that the first movement of piston (6) that which corresponds to filling cone (15), takes place without the latter moving. In a second product supplying stage stop (8) acts on rod (9) to move it downwards and with it cone (15), so that the latter is moved downwards while creating the ice cream cap which traditionally extends above the open end of cone (15). Consequently, at all times an optimum distance is maintained between the product deposition area and the nozzle (5) where said product is dispensed.

As a complement of the described structure, rod (9) is provided in its lower end, as shown in FIG. 2, with an indicator (16) which moves within a guide (17), that is bent and has a rounded edge. Movement of the indicator (16) within the guide (17) makes rod (9) rotate about its own axis at the end of the downwards motion of piston (6), i.e. at the end of the product dosing or dispensation stage. This rotation causes a sideways motion of support (13) and thereby also of cone (15) placed within it, which is thus removed from the position axially opposite nozzle (5), to a position perfectly suited for its manual removal from said support (13). The entire described operation can be performed with a single hand, which is initially used to act on the control lever, and once said lever is released, to extract cone (15) full.

Once the manual actuation of the control lever ends, piston (6) returns to the original raised position through the action of the restoring spring, not shown in the figures, while rod (9) and its support (13) remain in the lower extreme position arrived at as indicator (16) is retained in the end of the bent guide (17), so that said support (13) not only retains its lower extreme position but also the position of sideways swivelling with respect to nozzle (5). This allows simple implantation of a new empty cone (15). A slight sideways manual operation of support (13) is enough to make indicator (16) leave the aforementioned stable extreme position and the support (13) rotates as it moves towards a position axially opposite nozzle (5) under the action of spring (11). Once the support (13) has reached its upper extreme position a new operational cycle of the machine may begin.

Figure 5:
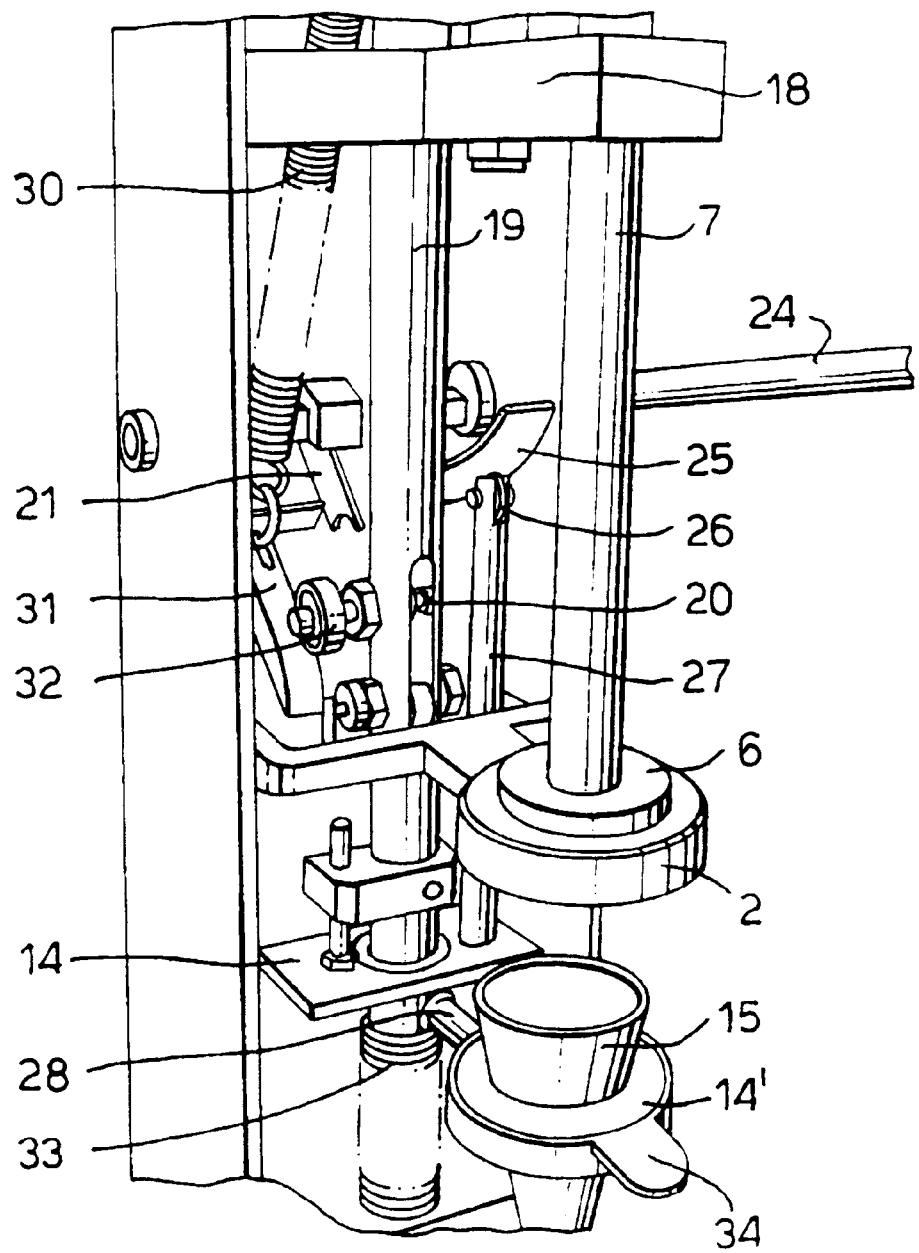
FIG. 5 shows an anterior-lateral perspective view of that shown in the previous figure.

According the embodiment shown in FIGS. 3 to 5, stem (7) which is connected to piston (6) is solidarity joined by its upper end to a spring (18) which in turn is connected to a main rod (19), placed behind stem (7) and parallel to it. The main rod (19) is provided with a slot (20) inside which moves a jointed connecting cam (21) which emerges radially from a shaft (22) which is mounted on machine frame (23). One end of the shaft (22) is connected to control lever (24) external to said frame (23). The forward swivelling motion of the lever (24) implies a downwards motion to the main arm thereby to the stem (7) and piston (6) with respect to platform (2) on which the frozen product cartridge is established.

The shaft (22) is also connected to a second cam (25) which acts through roller (26) on the upper end of a second arm (27) joined to support (14). This support (14) is defined in two sectors (14, 14'), the latter including the orifice or housing for cone (15) and the former mounted so that it may slide along main rod (19), i.e. so that it may move vertically, with the two sectors (14, 14') connected to each other by a stem (28). The stem (28) crosses through the front of the frame (23) where it may engage and moves within slot (17) as defined in the previous embodiment. The slot is provided with a first vertical segment which allows lowering of support (14, 14') during the ice cream ball formation stage on cone (15), and a second segment inclined laterally and downwards. The second segment causes the sideways motion of the stem (28) which thereby moves sector (14') of the support and the cone positioned therein. The stem (28) moves laterally and downwards to a position where it is retained by end notch (29) as shown in FIG. 3.

A spring (30) acts on a third connecting rod (31) which through a roller (32) acts in turn on main rod (19) causing it to rise, and therefore piston (6) as well, when control lever (24) is released. At the same time a second spring (33) coaxially mounted on the lower end of rod (19) tends to raise support (14, 14') when the stem (28) is released from notch (29) at the end of the bent slot (17). This release is affected by a manual operation by acting on handle (34) provided on the front of support (14'). Consequently after the support (14') has moved sideways to allow a simple removal of cone (15), it maintains this stable position until cone (15) is eliminated and replaced by an empty one, provided handle (34) is not operated, at which time stem (28) is released and spring (33) in turn causes the restoration of support (14, 14') to its initial position for a further cycle of the machine.

What is claimed is:

1. An extruding machine for an edible frozen product employing cartridges which contain the frozen product and which are provided with an extrusion nozzle, said extrusion machine comprising a platform (2) on which the cartridge (3) rests, a piston (6) which is adapted for movement within the cartridge (3), the movement actuated through a stem (7) operatively connected to an external control lever, and wherein the extrusion machine is characterised in that it comprises:

i) a rod (9,19) which is parallel to stem (7);
   ii) the stem (7) is provided with a lateral means (8, 18) which is adapted to act on the rod (9,19) such that the rod (9,19) may be moved downwards when said stem (7) is moved downwards to actuate downward movement of the piston within the container to extrude the frozen product through the nozzle thereof;
   iii) a support having an orifice in which a removable container (15) for receipt of extruded frozen product is placed, said support being operatively connected to rod (9,19) such that said support moves downwards with the rod (9,19).

2. An extruding machine according to claim 1 wherein said lateral means comprises a lateral stop (8).

3. An extruding machine according to claim 2, wherein the extreme upper position for said rod, is such that the top end of rod (9) is considerably distant from stop (8) associated to stem (7) of piston (6) when said piston is in the extreme upper position within the cartridge (3) so that in a first stage of the downwards motion of piston (6), stop (8) does not act on the rod (9).

4. An extruding machine according to claim 3 wherein motion of the piston defines a second stage of downwards motion such that stop (8) acts on rod (9) to move rod and support (13) downwards until it reaches a lower extreme position.

5. An extruding machine according to claim 3 wherein:
   a) said first stage of downwards motion of the piston (6) extrudes a sufficient quantity of frozen product from the cartridge (3) to fill a container (15) placed in the orifice (14) of the support (13);
   b) said second stage of downwards motion of the piston (6) further extruding frozen product to overfill said container (15).

6. An extruding machine according to claim 5, wherein the rod (9) is provided with a lateral indicator (16) which moves within guide (17), which is bent and has rounded edges, which, immediately before piston (6) reaches its lower extreme position, forces said rod (9) to rotate about its own axis such that with the ensuing swivelling of support (13) and the container (15) or orifice is rotated from a position laterally opposite nozzle (5) which dispenses the extruded product.

7. An extruding machine according to claim 1, wherein rod (9) moves vertically along a guide (10) against the opposition of a spring (11) which tends to move said rod to an extreme upper position defined by a stop (12).

8. An extruding machine according to claim 1 wherein;
   a) said control level (24) is connected to a transverse shaft (22) provided with a cam (21) which transmits vertical motion to rod (19).
   b) said lateral means comprises a support (18) connected between said rod (19) and stem (7).

9. An extruding machine according to claim 8 wherein the shaft (22) is also solidarity connected to a second cam (25) which acts on a second vertical arm (27), on the side of and parallel to main arm (19), said secondary arm (27) is connected by its lower end to support (14,14') for container (15).

10. An extruding machine according to claim 9 wherein the container (15) support, consists of two sectors, a front sector (14') provided with the housing for cone (15) and a rear sector (14) which slides vertically along main rod (19) against the action of spring (33), the sectors (14,14') joined to each other by means of a stem (28).

11. An extruding machine according to claim 10, further comprising a guide (17) adapted to receive stem (28) as said main rod (19) and secondary arm (27) move downwards.

12. An extruding machine according to claim 11 wherein said guide (17) defines an upper vertical segment for vertical motion of said stem (28) and thereby said support (14,14'), and a lower segment inclined downwards and outwards to move said stem (28) so as to affect sideways displacement of at least sector (14') of said support.

13. An extruding machine according to claim 12 wherein said lower segment of the guide (17) terminates in a notch (29) which retains said stem (28) at the sideways displaced position.

14. An extruding machine according to claim 13 wherein said stem (28) may be removed manually from said notch (29).

15. An extruding machine according to claim 8 further comprising a spring (30) at its top, which acts on a third cam (31) which in turn rests on a roller (32 associated to the main rod (19), so that the tension of said spring (30) urges main rod (19) to rise, and therefore also piston (6), when control lever (24) is not manually acted upon.

* * * * *